(12) United States Patent
Wang

(10) Patent No.: US 10,623,192 B2
(45) Date of Patent: Apr. 14, 2020

(54) GATE OXIDE BREAKDOWN IN OTP MEMORY CELLS FOR PHYSICAL UNCLONABLE FUNCTION (PUF) SECURITY

(71) Applicant: Synopsys, Inc., Mountain View, CA (US)

(72) Inventor: Larry Wang, San Jose, CA (US)

(73) Assignee: Synopsys, Inc., Mountain View, CA (US)

(*) Notice: Subject to any disclaimer, the term of this patent is extended or adjusted under 35 U.S.C. 154(b) by 144 days.

(21) Appl. No.: 15/687,399

(22) Filed: Aug. 25, 2017

(65) Prior Publication Data
US 2019/0068383 A1    Feb. 28, 2019

(51) Int. Cl.
| | | |
|---|---|---|
| G11C 17/00 | (2006.01) | |
| H04L 9/32 | (2006.01) | |
| G11C 17/14 | (2006.01) | |
| G06F 21/72 | (2013.01) | |
| G11C 17/18 | (2006.01) | |
| G06F 21/73 | (2013.01) | |
| G11C 7/24 | (2006.01) | |
| G11C 17/16 | (2006.01) | |

(52) U.S. Cl.
CPC .......... *H04L 9/3278* (2013.01); *G06F 21/72* (2013.01); *G06F 21/73* (2013.01); *G11C 7/24* (2013.01); *G11C 17/146* (2013.01); *G11C 17/16* (2013.01); *G11C 17/18* (2013.01); *H04L 2209/12* (2013.01)

(58) Field of Classification Search
CPC ...................................... G11C 7/24
See application file for complete search history.

(56) References Cited

U.S. PATENT DOCUMENTS

| | | | |
|---|---|---|---|
| 8,848,417 B2 | 9/2014 | Petitprez | |
| 9,613,714 B1 | 4/2017 | Wong et al. | |
| 2015/0003142 A1* | 1/2015 | Chung | G11C 29/027 365/96 |
| 2017/0053708 A1 | 2/2017 | Wong et al. | |
| 2017/0200508 A1* | 7/2017 | Grigoriev | G11C 7/24 |
| 2017/0257222 A1* | 9/2017 | Pedersen | G06F 1/26 |
| 2017/0301406 A1* | 10/2017 | Wong | G06F 7/588 |

FOREIGN PATENT DOCUMENTS

| | | |
|---|---|---|
| CN | 103716152 A | 4/2014 |
| TW | 201727657 A | 8/2017 |

OTHER PUBLICATIONS

Taiwan Intellectual Property Office, Office Action, Taiwan Application No. 107123674, dated Aug. 8, 2019, 13 pages.

* cited by examiner

*Primary Examiner* — Uyen Smet
(74) *Attorney, Agent, or Firm* — Fenwick & West LLP

(57) ABSTRACT

Gate oxide breakdown in the programming element of an OTP (One-Time Programmable) memory cell can vary widely. The resulting large variations in the conductivity of the programmed memory cells in an OTP memory cell array is used for a PUF (Physically Unclonable Function). A method of obtaining a PUF value from an OTP memory cell array is described.

10 Claims, 5 Drawing Sheets

GATE OXIDE BREAKDOWN IN OTP MEMORY CELLS FOR PHYSICAL UNCLONABLE FUNCTION (PUF) SECURITY

BACKGROUND OF THE INVENTION

This invention relates to OTP (One-Time Programmable) memory cells and their memory arrays and, in particular, to using the inherent variations in the programmability of OTP memory cells in an array for PUF (Physical Unclonable Function) security.

The random variability of some semiconductor device parameters has been used or considered for security applications. These parameters include the threshold voltage $V_T$ of MOSFETs (Metal Oxide Semiconductor Field Effect Transistors), the on-current, and metal resistance. However, due to various semiconductor mechanisms, such as Hot Carrier Injection (HCI), Time-Dependent Dielectric Breakdown (TDDB), ElectroMigration (EM), the constancy of these parameters over the time is problematical and correspondingly can cause a deterioration of the PUF in the semiconductor device. Furthermore, with constant improvements in semiconductor process control, process variations are reduced rendering PUF signals based upon these parameters more and more difficult to distinguish.

Hence what is desirable is a semiconductor device parameter which is variable with PUF signals based upon that parameter which unlikely to deteriorate over time. The present invention provides for such a semiconductor device parameter which can be used to generate PUF signals which are unlikely to change.

BRIEF SUMMARY OF THE INVENTION

The present invention provides for an integrated circuit which has an array OTP (One-Time Programmable) memory cells. Each OTP memory cell is programmable by rupturing a gate oxide layer in the OTP memory cell. The array of OTP memory cells has approximately half of the memory cells programmed responsive to gate oxide layer variations in the OTP memory cell array. The array of OTP memory cells sends the contents of the programmed memory cells of the array as output signals in response to input signals. The input signals form a PUF (Physical Unclonable Function) challenge signal to the integrated circuit and the output signals form a PUF (Physical Unclonable Function) response signal to the challenge signal.

The present invention also provides for an integrated circuit having an array of OTP memory cells with each OTP memory cell having a gate oxide for programming the memory cell. The array has approximately half of the memory cells programmed cell by the steps of: initially programming the array of OTP memory cells with a first voltage, the first voltage predetermined to program approximately half of the memory cells; verifying the states of the initially programmed memory cells to separate the initially programmed memory cells into programmed and unprogrammed memory cells; reprogramming the programmed memory cells; verifying the states of the reprogrammed memory cells to separate the reprogrammed memory cells into well programmed and weakly programmed memory cells; and repeating the reprogramming step for the weakly programmed memory cells. The resulting pattern of programmed and unprogrammed OTP memory cells responsive to gate oxide variations in the OTP memory cells forms a PUF signal.

The present invention further provides for a method of operation in an integrated circuit having an array of OTP memory cells. The method has the steps of: receiving a PUF challenge signal in the form of a set of electrical signals; responding with the contents of the OTP memory cell array, the OTP memory cell array having approximately half of the memory cells programmed responsive to gate oxide variations in the OTP memory cells in the array; and transmitting the contents of the OTP memory cell array. The transmitted contents correspond to a PUF response signal to the PUF challenge signal.

Other objects, features, and advantages of the present invention will become apparent upon consideration of the following detailed description and the accompanying drawings, in which like reference designations represent like features throughout the figures.

DETAILED DESCRIPTION OF THE INVENTION

The present invention uses the breakdown of the gate oxide in OTP memory cells for the generation of PUF signals. The oxide breakdown is highly variable over the cells in the array due to the random nature of the thickness of the oxide and of the shape and quality of the oxide. Once the oxide has broken down, it maintains its state without much change. At a sufficiently low read operation voltage, the unbroken oxide can also maintain its state without degrading over time.

Figure 1A:
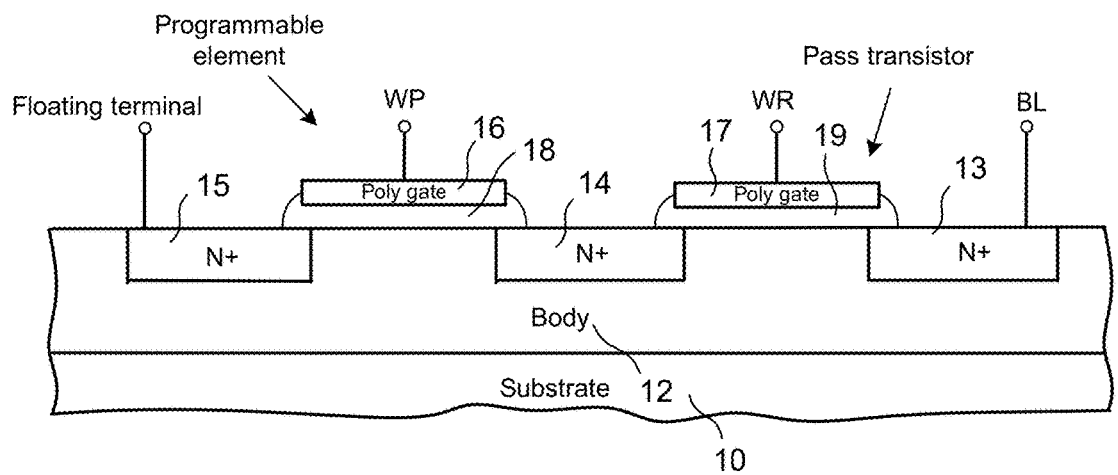
FIG. 1A is a representative cross-sectional side view of a typical OTP memory cell.

FIG. 1A shows an example of a generalized two-transistor OTP memory cell in a cross-sectional side view. The memory cell has a pass MOSFET (Metal-Oxide-Semiconductor Field Effect Transistor) and a programmable element in the form of a second (MOSFET) transistor. The pass or select transistor is formed by a gate electrode 17 slightly removed from and spanning two N+ source/drain regions 13 and 14 located in a semiconductor body 12 of P-conductivity. Gate electrodes, such as the electrode 17, can be formed by many different conductive materials including, e.g., doped polysilicon, metals (such as tungsten and tantalum), alloys of metal and silicon (either poly or single crystal), and other materials and combinations of materials, which are well known in the semiconductor processing field. A thin insulating oxide layer 19, called a gate oxide, separates the body 12 and N+ regions 13 and 14 from the gate electrode 17 which is part of a read word line WR. The two source/drain regions 13 and 14 and the gate electrode 17 define a channel region on the top of the body 12 for the pass transistor. The N+ source/drain region 13 is connected to a bit line BL and the N+ source/drain region 14 forms a source/drain region of a second MOSFET transistor, the programmable element. A second N+ source/drain region 15 which is electrically floating, is part of the second MOSFET transistor which has a gate electrode 16 slightly removed from and spanning the two N+ source/drain region 14 and 15. The gate electrode 16 is part of the programming word line WP. A thin insulating gate oxide layer 18 separates the body 12 and N+ regions 14 and 15 from the gate electrode 16. The two source/drain regions 14 and 15 and the gate electrode 16 define a channel region on the top of the body 12 for the programmable element.

Further details of different two-transistor OTP memory cell structures are not shown, but can be found in many references, such as U.S. Pat. Nos. 7,471,540 and 7,623,368, both of which are assigned to the present assignee and incorporated by reference for all purposes.

Figure 1B:
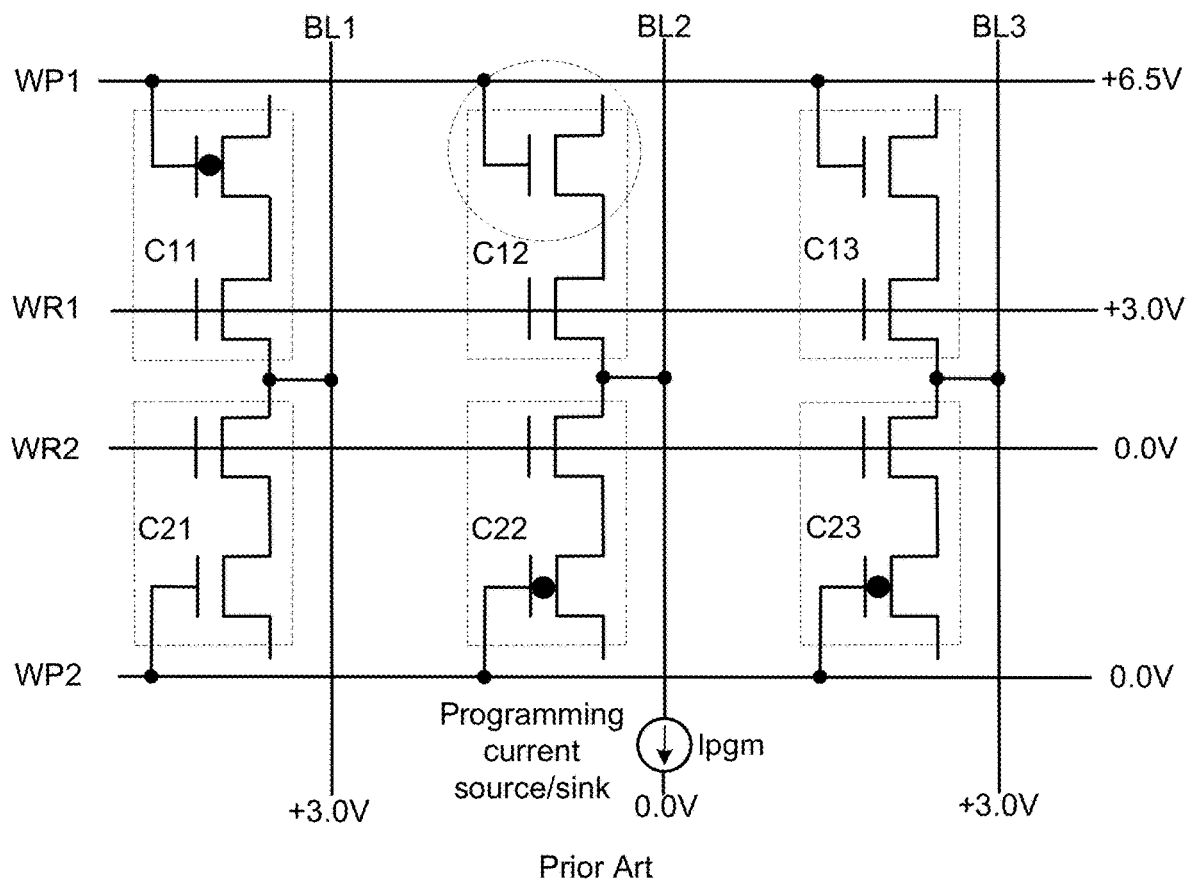
FIG. 1B illustrates an array of such OTP memory cells.

FIG. 1B shows an exemplary array of OTP memory cells which is part of a larger array of cells and is used to explain the programming of the memory cells in an array. Six memory cells are shown in the array with three vertical bit lines, BL1-BL3, and two pairs of horizontal word lines, read word lines WR1-WR2 and programming word lines WP1-WP2. It should be noted that "vertical" and "horizontal" refer to the drawing directions to better explain the memory cell array. Each OTP memory cell has the gate electrode of its pass transistor connected to a WR line and the gate electrode of its programming element transistor connected to a WP line. Pairs of memory cells are connected in common to the bit lines. Hence memory cells C11 and C21 are connected in common to bit line BL1. As described above, one source/drain of the programming element transistor is left floating and shown without a connection. The other source/drain is also a source/drain of the memory cell's pass transistor.

Figure 2:
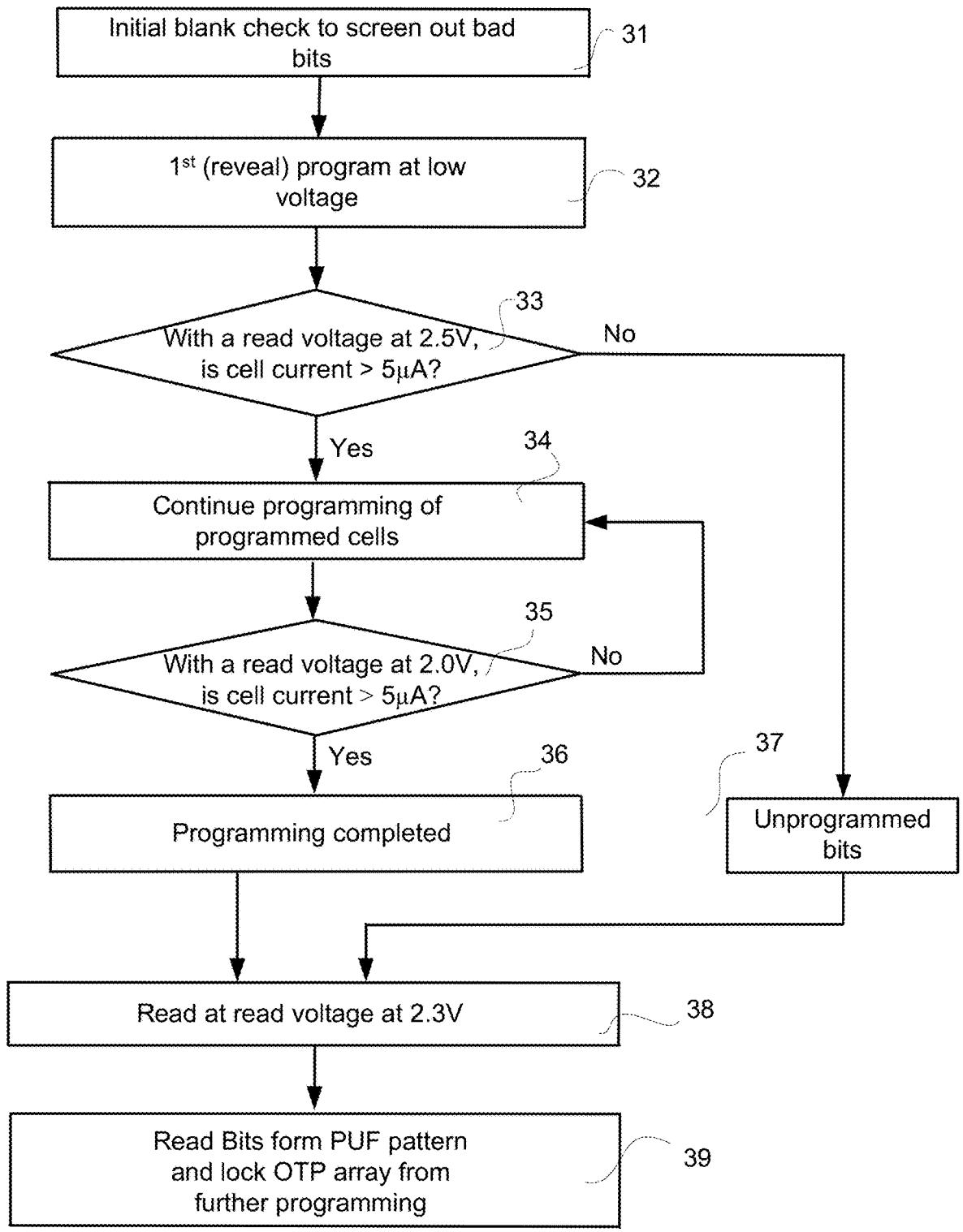
FIG. 2 represents a process flow of steps to program approximately half of the OTP memory cells in an array in accordance with one embodiment of the present invention.

The drawing shows that three memory cells, C11, C22 and C23, have been programmed. To program a memory cell, the programming word line WP of the selected is raised to some high positive voltage Vpp, the read word line WR of the selected cell set to a voltage about one-half Vpp, termed Vpp2, and the bit line BL of the selected memory cell set to ground, 0 volts. In the example of FIG. 2, the cell selected for programming is memory cell C12. The drawing does not show a voltage source, in this case ground, and selection transistor(s), typically in a decoder circuit which connects the selected memory cell to the voltage source for programming. In one example, the voltage on the programming word line WP1 is raised to +6.5 volts, the read word line WR1 for the gate electrode of the pass transistor is raised to +3.0V, and the bit line BL2 is set at ground, 0 volts. A programming current source or sink provides a programming current Ipgm to the selected memory cell.

While the bit line of the selected memory cell is set at 0 volts, the bit lines for the other cells are set at Vpp2 to prevent leakage by the programmed memory cells (in this example, C11) or to prevent disturbing the unprogrammed memory cells (in this example, C13), which are all connected to the same programming word line as the selected cell. The programming and read word lines for unselected memory cells, in this example, cells C21, C22 and C23, are set to 0 volts. Note that all the voltages are 0 or positive.

In reading the logic state of a memory cell, the gate electrode of the MOSFET programming element of the selected memory cell is raised to a small positive voltage, typically between 0 and 2.5 volts, while the bit line of the selected memory cell is set to ground. The gate electrode of the MOSFET pass transistor is also turned on and the bit line current flowing through the selected memory cell determines how the logic state of the cell. If the selected memory cell has been programmed, then there should be a definite bit line current; if the cell has not been programmed, there should be no current, except perhaps for small leakage currents.

Each memory cell stores a bit of information, a "1" or a "0," depending on whether the cell has been programmed or not. The particular correspondence between the value of a bit and whether the cell is programmed or not is arbitrarily defined. As explained above, programming is performed by a large voltage between the gate 16 of the programming element and its body 12 and source/drain region 14 which causes a breakdown or rupture of the gate oxide 18 of the programming element. With the breakdown of the gate oxide 18, a conducting plug is formed through the gate oxide 18 to form a programmed connection between the gate electrode 16 and the N+ source/drain region 14 and/or the underlying body 12. Since a cell is programmed by creating an electrical connection, the described memory cells are sometimes called "anti-fuse" OTP cells.

A problem with the OTP memory cell is the variability in the quality of the programmed connection. Gate oxide breakdown can vary widely with unwelcome decreased conductivity and resulting large variations in the conductivity of the programmed memory cells of an array. With a particular read voltage on the gate of a selected programmed memory cell cell, the bit line current varies according to the quality of the conducting plug formed by the rupture of the gate oxide of the programming element of the memory cell. If the programmed connection is good, i.e., the conducting plug provides a low resistance (or impedance) in the read circuit, the bit line current is high during a read operation. If the programmed connection is poor, i.e., the conducting plug provides a high resistance in the read circuit, the bit line current is low. The present invention utilizes this variability in the gate of oxide breakdown for a PUF (Physically Unclonable Function) integrated circuit. Hence a standard anti-fuse OTP memory cell array is used as the foundation of the PUF. A blanket programming operation, the steps of which are shown in FIG. 2, is performed with a predetermined voltage and number of pulses applied to all array cells. The voltage is predetermined for a particular semiconductor process technology so that approximately half of the bits in the memory cell array are programmed "1". The other bits remain unprogrammed ("0"). Of course, the association of "1" with a programmed cell and "0" with an unprogrammed cell is arbitrary and could very well be reversed. The pattern of "1"s and "0"s, or more precisely, programmed and unprogrammed cells, is used as the PUF fingerprint.

Figure 3:
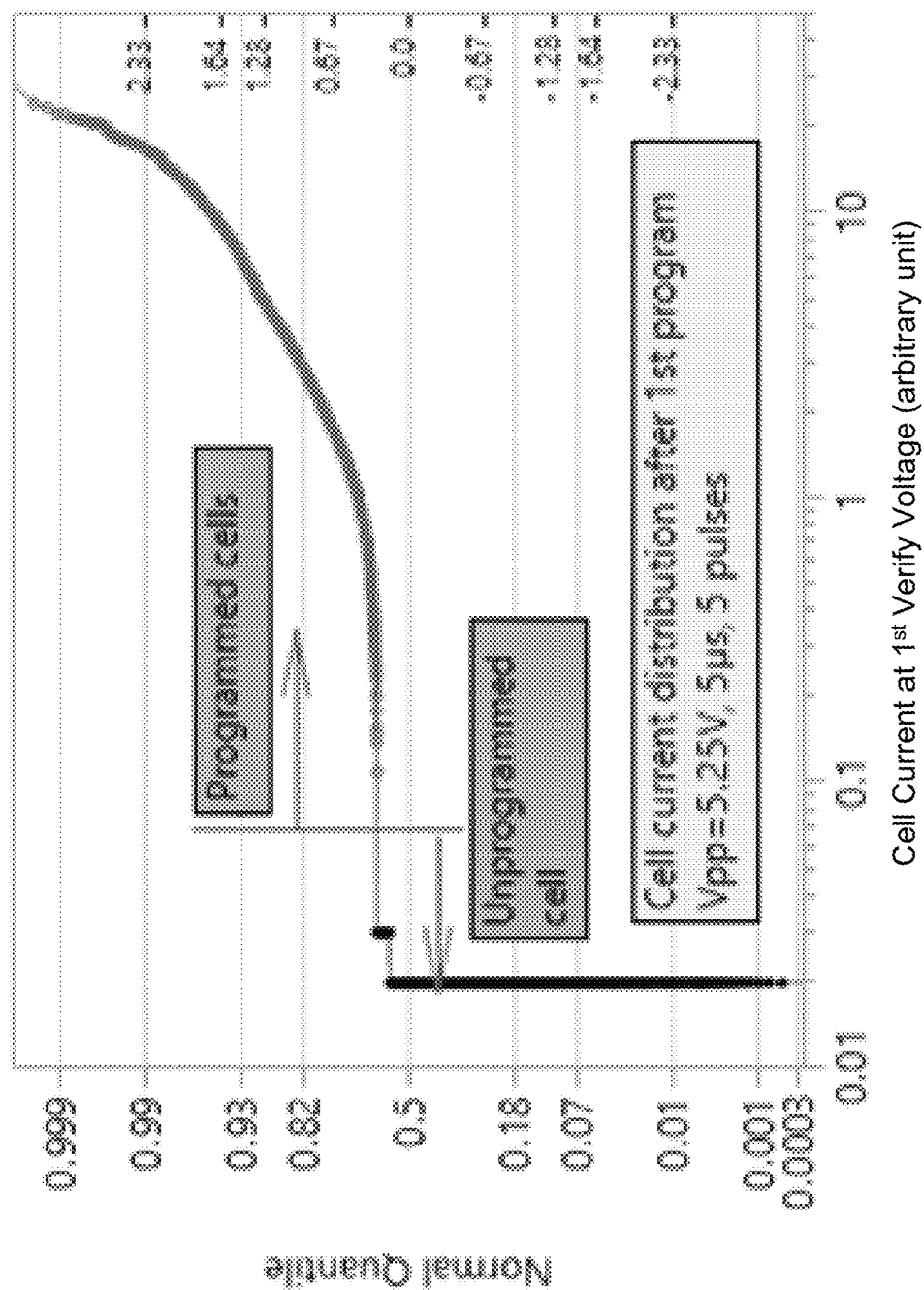
FIG. 3 shows an example of a cell current distribution after a proper programming on the OTP memory cell array according to one embodiment of the present invention.
Figure 4:
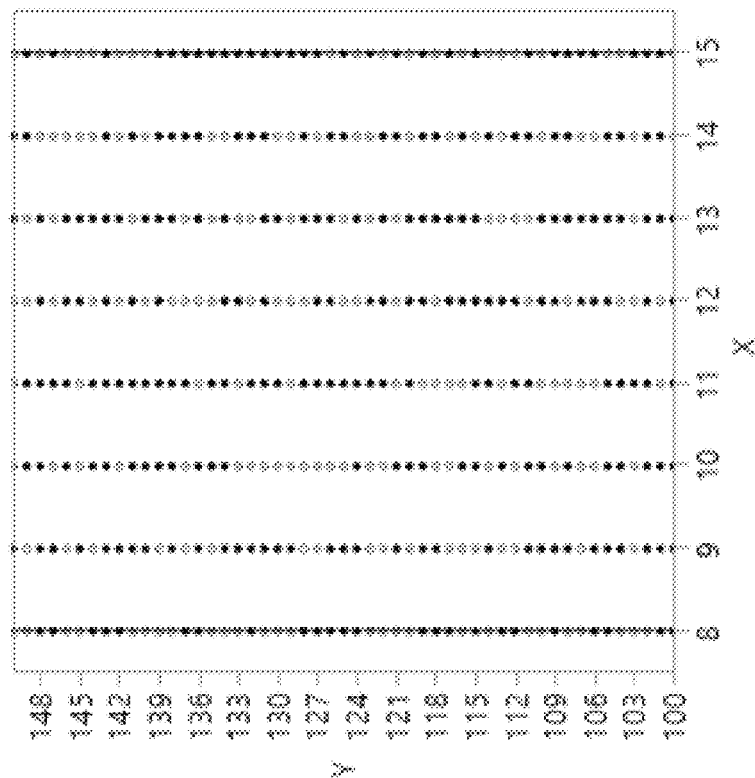
FIG. 4 is a representation of the locations of programmed and unprogrammed memory cells in a memory array after a FIG. 2 programming is completed.
Figure 4:
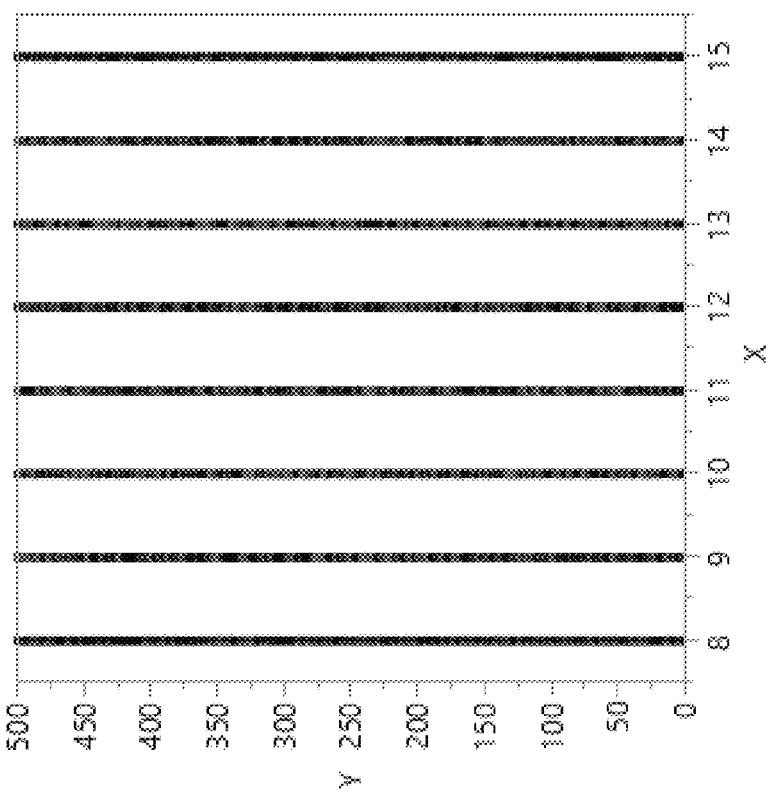

The programming voltage and number of pulses to program approximately half of the memory cell in the array is predetermined by electrical characterization. The plot of FIG. 3 is an example of the cell current distribution after the cell array completes a proper programming. As shown in the plot, programming was performed with a voltage of 5.25V held for 5 μs and repeated 5 times. The result is that half of the memory cells in array remain unprogrammed as indicated by the plotted vertical line on the left of the graph and half of memory cells are programmed by the plotted rising line on the right of the graph. The current magnitude of the weakest programmed cell is significantly separated from the current magnitude(s) of the unprogrammed cell (which should ideally be zero) as shown by the horizontal separation of the programmed memory cells to the right of the vertical line of unprogrammed cells. This difference allows the electronic circuits of the OTP memory cell array to clearly distinguish the cells which are programmed from which are unprogrammed. FIG. 4 is a representation of a portion of an OTP memory cell array which has been programmed as described above. The drawing on the left shows the programmed and unprogrammed memory cells as different shaded elements which are vertically arranged. The drawing of the right is a "blow-up," or enlargement, of the drawing on the right to better illustrate the individual memory cells, programmed and unprogrammed.

The program process flow whose steps are illustrated in FIG. 2 operates on all the OTP memory cells of the array. The process flow starts with a step 31 to check for all the bad cells in the array, i.e., faulty cells which are already programmed in the manufacturing process. These cells are screened out, i.e., eliminated from the subsequent programming process. Then a first programming step 32 is performed at the predetermined programming voltage which is low enough so as not to program all the cells of the array in one pulse. Once the first programming step 32 is performed, a first verification read operation step 33 is performed to separate the cells which have become programmed from the cells which remain unprogrammed after step 32. The read voltage is set high enough to reveal all the programmed bits, including those which are weakly programmed. In one example, the read voltage is set at 2.5V and the current of each cell is tested against a predetermined value of 5 μA. If the current through a cell being read is above the predetermined value, the cell is considered programmed. If the current is below the predetermined value, the cell is considered unprogrammed. Those cells that were programmed according to the verification read step 33 receive additional pulses by step 34 to ensure that the cell is truly programmed. Those cells which fail the read verification are considered to be unprogrammed ("0") by step 37 and receive no further pulses.

In the programming step 34, those cells considered programmed by step 33 are programmed with voltages larger than the predetermined programming voltage of step 32 to solidify the programming of those memory cells. The magnitude of the programming voltage and the duration of the programming pulses are dependent upon the particular OTP memory cell structure and semiconductor process used in manufacturing the OTP memory cell array. One exemplary set of programming values has a programming voltage of 6.5V with a pulse width of 5 μs.

After the step 34, a second verification read step 35 is performed. The cells are read with a predetermined voltage (e.g., 2.0V) which provides a margin to separate the well programmed cells from the weakly programmed cells. In this example, the read voltage is 2.0V, 0.5V below the read voltage of step 33. The lowered read voltage ensures a lowered bit line current for the weakly programmed memory cells (i.e., those with conducting plugs with high resistances/ impedances) and causes these cells to fail the read step 35. The failed memory cells return to step 34 for continued programming until the cells are well programmed and meet the criteria of step 35. With the cells which have already passed the test of step 35, the cells pass to step 36 with no further programming.

After all the programmed cells have met the criteria set by step 35, the programming of cells has been completed (step 36). Then all the cells, programmed and unprogrammed are read under the conditions of step 38 in which the read voltage is intermediate between the read voltages of steps 33 and 35, in this example, 2.3V (and a 5 μA bit line cell current cut-off). At this intermediate read voltage, there are margins for the memory cells to be read as either programmed (well programmed by the operations of the previous paragraph) or unprogrammed. The bits read out by this step 38 form the PUF signal and the OTP memory cell array is locked from further programming by optional step 39.

In the description above the read voltages were varied in steps 33, 35 and 38 with the bit line cell current of the selected memory cell tested against the same value. Alternatively, the circuit parameters can be used differently for read operations. For example, a fixed current can be driven through the selected memory cell for a read operation and the voltage sensed. Of course, the circuitry about the OTP memory cell array must be changed to accommodate the different operations and sensing of the different parameters.

It should be noted that process flow has been described in terms of an operation or step being performed on all of the relevant memory cells before moving on the next operation or step. FIG. 2 can also be used to describe the process flow repeatedly performed on single memory cells until PUF signal has been recorded from all the programmed and unprogrammed memory cells. It should also be understood that the memory cell array used for the PUF signal need not be a separate array but can be a subset of a larger array of OTP memory cells.

In PUF terminology the bits from the OTP memory cell array are the response to the challenge posed to the memory array. Due to the unpredictability of the gate oxide breakdown of each cell in the array, even identical memory cell arrays do not produce the same response if the number of bits is sufficiently large. At least 128 bits can be used to create a fairly secure PUF signal. Thus signals into an integrated circuit holding the array to read the contents of the array generates a response of at least 128 bits in a pattern which is unique to the array and integrated circuit, i.e., a PUF (Physical Unclonable Function).

Figure 5:
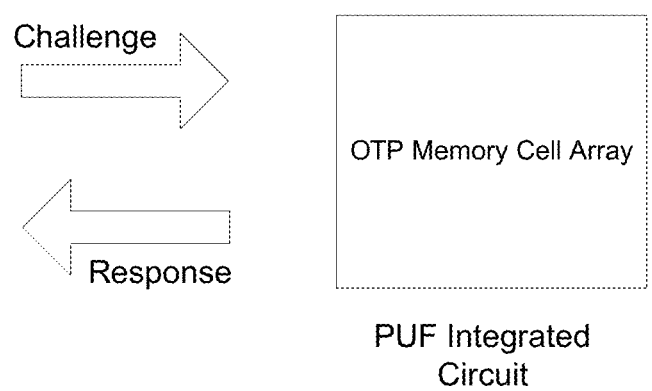
FIG. 5 illustrates a generalized exchange of challenge and response signals for PUF integrated circuit according to the present invention.

The programmed OTP memory cell array allows for the manufacture of an integrated circuit with a PUF function. For example, the PUF integrated circuit might be incorporated into device as simple as a credit or debit card, or as complex as a computer system. FIG. 5 shows how the PUF integrated circuit might operate at a general level. The integrated circuit as part of a device or system receives a PUF challenge signal and sends back a PUF response signal comprising the contents of the programmed OTP memory array. The PUF integrated circuit can be used for authentication and the key generation for cryptographic ciphers, for example. The programmed OTP memory cell as described relies upon a semiconductor parameter which is a random, but stable, physical effect. The programmed OTP memory cell array is unique, stable, has low implementation cost and low risk of modeling.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. An integrated circuit comprising
an array of OTP (One-Time Programmable) memory cells, each OTP memory cell programmable by rupturing a gate oxide layer in the OTP memory cell, the array of OTP memory cells comprising a subset of the OTP memory cells programmed responsive to gate oxide layer variations in the array of OTP memory cells, the array of OTP memory cells sending contents of the programmed memory cells of the array as output signals in response to input signals; and a programming circuit coupled to the array of OTP memory cells, the programming circuit configured to generate a plurality of voltage pulses with different voltage values and apply the plurality of voltage pulses to a programming word line of the OTP memory cell for programming the OTP memory cell, wherein the input signals form a PUF (Physical Unclonable Function) challenge signal to the integrated circuit and the output signals form a PUF (Physical Unclonable Function) response signal to the PUF challenge signal.

2. The integrated circuit of claim 1, wherein the PUF response signal comprises at least 128 bits.

3. The integrated circuit of claim 2, wherein the array of OTP memory cells is part of another array of OTP memory cells.

4. The integrated circuit of claim 3, wherein each of the OTP memory cells comprises a two-transistor OTP memory cell.

5. The integrated circuit of claim 1, wherein the array of OTP memory cells is part of another array of OTP memory cells.

6. The integrated circuit of claim 1, wherein each of the OTP memory cells comprises a two-transistor OTP memory cell.

7. A method comprising:

applying a plurality of voltage pulses with different voltage values to a programming word line of at least one OTP (One-Time Programmable) memory cell in an array of OTP memory cells for programming the at least one OTP memory cell, the array of OTP memory cells comprising a subset of the OTP memory cells programmed responsive to gate oxide layer variations in the array of OTP memory cells;

receiving, at the array of OTP memory cells, a PUF challenge signal comprising a set of electrical signals; and in response to the PUF challenge signal, sending contents of the programmed subset of the OTP memory cells as output signals, wherein the output signals form a PUF response signal to the PUF challenge signal.

8. The method of claim 7, wherein the contents of the programmed subset of the OTP memory cells comprise at least 128 bits.

9. The method of claim 7, wherein the PUF challenge signal comprises m bits and the PUF response signal comprises n bits.

10. The method of claim 9, wherein the n bits of the PUF response signal comprise at least 128 bits.

* * * * *